United States Patent
Kusama et al.

(10) Patent No.: US 6,891,445 B2
(45) Date of Patent: May 10, 2005

(54) PHASE MODULATOR

(75) Inventors: Noboru Kusama, Tokyo (JP); Katsuya Kitada, Tokyo (JP); Masahiro Akiyama, Tokyo (JP); Takashi Nakagawa, Tokyo (JP); Noriko Sato, Tokyo (JP)

(73) Assignee: NEC Engineering Ltd., Tokyo (JP)

( * ) Notice: Subject to any disclaimer, the term of this patent is extended or adjusted under 35 U.S.C. 154(b) by 0 days.

(21) Appl. No.: 10/458,279

(22) Filed: Jun. 11, 2003

(65) Prior Publication Data

US 2004/0085148 A1 May 6, 2004

(30) Foreign Application Priority Data

Oct. 31, 2002 (JP) ........................................ 2002-316928

(51) Int. Cl.$^7$ ................................................. H03C 3/00
(52) U.S. Cl. ........................ 332/144; 332/103; 375/279; 375/308
(58) Field of Search ................................ 332/144, 103; 375/279, 308

(56) References Cited

U.S. PATENT DOCUMENTS

| | | | |
|---|---|---|---|
| 4,584,541 A | * | 4/1986 | Nossen ........................ 332/145 |
| 4,680,556 A | | 7/1987 | Nakamura et al. |
| 5,121,412 A | * | 6/1992 | Borth .......................... 375/308 |

OTHER PUBLICATIONS

J.H. Gray, "Graychip Application Notes: Building a QAM Modulator Using a GC2011 Digital Filter Chip," Graychip, Inc. (Oct. 6, 1984), pp. 1–4.

W.R. Bennett et al., "Data Transmission," Inter–University Electronics Series, vol. 2, McGraw–Hill Company, pp. 50–53.

* cited by examiner

Primary Examiner—Arnold Kinkead
(74) Attorney, Agent, or Firm—Foley & Lardner LLP

(57) ABSTRACT

In response to changes in an input binary digital signal, a 3rd order cosine pulse waveform, which, when it is changed in the increasing direction, has "0" level in a first period of T/12 (T corresponding to one-half cycle of the binary digital signal), is changed as a waveform of $(h/2)(1+\cos(3\pi t/T)+\pi/4)$ in the next period of 4T/12 ($-5T/12 \leq t \leq -T/12$) and has an h (constant) level in the remaining period of T/12, and when it is changed in the reducing direction, has the h level in the first period of T/12, is changed as a waveform of $(h/2)(1+\cos(3\pi t/T)-\pi/4)$ in the next period of 4T/12 ($T/12 \leq t \leq 5T/12$) and also has "0" level in the remaining period of T/12. By using this pulse wave, a flat part is generated in a time width of T/12 with respect to a judgment point. It is thus possible to improve the immunity to the effects of digital signal jitter, obtain change judgment with a sole single pulse and reduce the circuit scale and the power consumption.

21 Claims, 9 Drawing Sheets

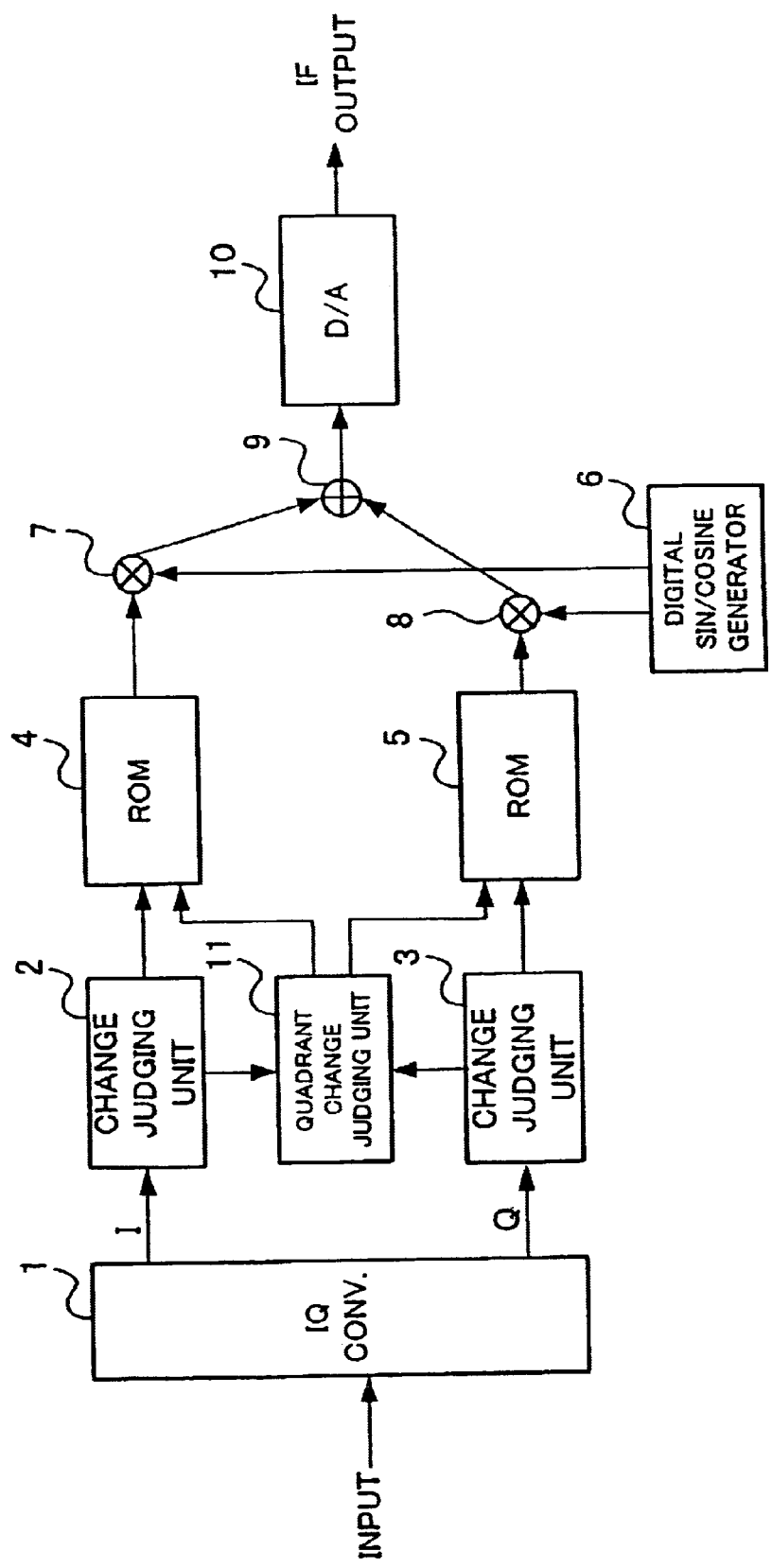

PHASE MODULATOR

BACKGROUND OF THE INVENTION

This application claims benefit of Japanese Patent Application No. 2002-316928 filed on Oct. 31, 2002, the contents of which are incorporated by the reference.

The present invention relates to phase modulators and, more particularly, to phase modulators for phase modulating digital signals used in radio communication systems.

Phase modulators used in radio communication and like technical fields were constructed as analog circuits. In recent advancement of digital circuits, however, a circuit up to a part for modulating a carrier as carrier wave tends to be provided in a digital circuit (see a first prior art: GRAYCHIP APPLICATION NOTES, BUILDING A QAM MODULATING USING A GC2011 DIGITAL FILTER CHIP, Oct. 6, 1994, Joseph H, Gray, pp. 1–4).

FIG. 10 is a block diagram showing a digital phase modulator shown in this prior art. An input signal, which is a digital signal in the form of a bit train, is converted in an IQ converter 21 to I and Q signals, which are inputted to level judgment units 22 and 23, respectively. The outputs of the level judgment units 22 and 23 are inputted to FIR filters 24 and 25 as digital filters, respectively, for frequency band restriction.

A carrier generator 26 is provided as a carrier source for generating orthogonal carriers (sine and cosine carriers), i.e., digital sine and cosine signals, which are 90 degrees out of phase from each other. The carrier generator outputs are fed to multipliers 27 and 28, respectively to be multiplied by the outputs of the filters 24 and 25. The multiplier outputs are combined in an adder 29. The adder output is converted in a D/A converter to an analog signal, which is provided as IF signal.

The phase modulator shown in FIG. 10 is a well-known QPSK modulator, and is thus not described in detail. As shown above, by preparing the digital sine/cosine generator 26, the circuits for generating a multiple-value digital signal, multiplying (i.e., phase modulating) the signal in the digital modulators 27 and 28 and adding (i.e., combining) the product results, can be constructed as digital circuits.

Also, in a second prior art (U.S. Pat. No. 4,680,556) a digital phase modulator is disclosed, in which preliminarily calculated values obtained in correspondence to I and Q signal train combinations are written in a ROM (read-only memory) and, when required, memory data in an appropriate address is read out and D/A converted.

In the digital phase modulator shown in FIG. 10, digital FIR filters are used as the filters 24 and 25. This is done so because of the fact that the digital signal processing has to be carried out by calculating the intended pulse signal by taking the response of several preceding and succeeding pulses to considerations instead of calculating modulation output concerning a single signal (or pulse). The FIR filters, as is well known in the art, each have a multiple-stage multiplier, thus leading to large circuit scale and high power consumption. Furthermore, it takes a time for obtaining the filter outputs.

While in the digital phase modulator shown in the second prior art preliminarily calculated values are written in the ROM and, when required, memory data in an appropriate address is outputted and fed to the D/A converter, as shown in FIG. 3 in the second prior art, for determining the waveform of a digital pulse a waveform process which takes the effects of a plurality of pulses including preceding and succeeding pulses into considerations is necessary.

In such case, that is, in the case when it is intended to have a change on a time axis to correspond to a single pulse instead of carrying out the waveform process taking pluralities of preceding and succeeding pulses into considerations for the determination of the waveform of a single pulse, it may be thought to use a raised cosine pulse as disclosed in a third prior art (McGRAW-HILL BOOK COMPANY, INTER-UNIVERSITY ELECTRONICS SERIES, VOL. 2 DATA TRANSMISSION, 1965, Williams R, Bennett, et al. pp. 50–53). In this connection, an ideal rectangular pulse as shown in FIG. 11 has a great frequency spectrum width (or frequency band) and therefore cannot be processed in an actual circuit. By using a raised cosine pulse as shown in FIG. 12, the frequency band is more restricted, that is, it is made so narrow that the waveform of a pulse can be determined without consideration of the effects of preceding and succeeding pulses.

However, the waveform of this raised cosine pulse, however, has a drawback that the aperture of the so-called eye is maximum only at a momentary instant. The fact that the eye aperture is maximum only at a momentary instant is very disadvantageous for the determination of the waveform of a pulse having jitter, and gives rise to a reliability problem.

Furthermore, in a four-phase modulator, in the case where the phase-modulated wave vector is changed between the first and third quadrants and the second and fourth quadrants in the IQ phase plane, it passes through the origin on the IQ phase plane as shown in FIG. 3, and therefore, the phase-modulated signal envelope momentarily becomes zero. Such a signal has a disadvantage that it is distorted when being passed through a high output high frequency amplifier due to non-linear characteristics (saturation characteristic) of the amplifier.

SUMMARY OF THE INVENTION

An object of the present invention is to provide a phase modulator, which generates a phase-modulated waveform corresponding to independent change (i.e., bit-by-bit change) in an input digital signal and is capable of circuit scale reduction, power consumption reduction and operation rate improvement.

Another object of the present invention is to provide a phase modulator, which, when used as a four-phase modulator, can prevent the phase-modulated waveform vector to pass through the origin in the IQ phase plane for preventing the phase-modulated signal envelope from momentarily becoming zero.

According to an aspect of the present invention, there is provided a phase modulator for generating digital signals of phase-modulated carriers in response to changes in an input binary digital signal by using a waveform which, when it is changed in the increasing direction, has "0" level in a first period of T/12 (T corresponding to one-half cycle of the binary digital signal), is changed as a waveform of $(h/2)(1+\cos(3\pi t/T)+\pi/4)$ in the next period of $4T/12$ ($-5T/12 \leq t \leq -T/12$) and has an h (constant) level in the remaining period of T/12, and when it is changed in the reducing direction, has the h level in the first period of T/12, is changed as a waveform of $(h/2)(1+\cos(3\pi t/T)-\pi/4)$ in the next period of $4T/12$ ($T/12 \leq t \leq 5T/12$) and also has "0" level in the remaining period of T/12.

The phase modulator comprises an orthogonal carrier generating means for generating orthogonal carriers as the afore-said carriers, a means for converting the input binary digital signal to two trains of IQ signals corresponding to the orthogonal carriers, a phase modulating means for generating digital phase-modulated waves by phase modulating the orthogonal carriers with the individual waveforms of the two-train IQ signal, and a digital-to-analog converter means for converting the synthesized output of the digital phase-modulated waves and outputting the result of conversion as analog output.

The phase modulator further comprises a first memory means, in which increasing and reducing direction waveform data of the individual waveforms of the IQ signal are preliminarily stored, a second memory means, in which waveform data of the orthogonal carrier are preliminarily stored, and a change judging means for judging changes in the IQ signals and reading out data stored in the first memory means according to the result of the judgment, the phase modulating means including a multiplying means for multiplying data read out from the first memory means and data read out from second memory means, the product result being outputted to the digital-to-analog converting means.

In the phase modulator, in response to changes between the first and third quadrants and also between the second and fourth quadrants in the IQ phase plane of the IQ signals, a waveform change of $(h/2)(1+\cos(3\pi t/T)+\pi/4)$ is provided to one waveform signal of the IQ signals immediately, i.e., without provision of the first period of T/12, and a waveform change of $(h/2)(1+\cos(3\pi t/T)=\pi/4)$ is provided to the other waveform signal of the IQ signals after extension of the first period of T/12 to 2T/12. The change between the first and third quadrants and the change between the second and fourth quadrants are based on opposite direction rotations, respectively.

The phase modulator further comprises a first memory means, in which increasing and reducing direction waveform data of the individual waveforms of the IQ signal are preliminarily stored, a second memory means, in which waveform data of the orthogonal carrier are preliminarily stored, and a change judging means for judging changes in the IQ signals and reading out data stored in the first memory means according to the result of the judgment, the phase modulating means including a multiplying means for multiplying data read out from the first memory means and data read out from second memory means, the product result being outputted to the digital-to-analog converting means.

The phase modulating means includes a third memory means, in which the sum results of the products of the increasing and reducing direction waveform data of the individual waveforms of the IQ signal and the waveform data of the orthogonal carrier are preliminarily stored; and the phase modulator further comprises a means for judging changes in the IQ signal, reading out stored data from the third memory means and feeding the read-out data to the digital-to-analog converting means according to the judgment results.

The phase modulating means includes a third memory means, in which the sum results of the products of the increasing and reducing direction waveform data of the individual waveforms of the IQ signal and the waveform data of the orthogonal carrier are preliminarily stored; and the phase modulator further comprises a means for judging changes in the IQ signal and inter-quadrant change in the IQ phase plane, reading out stored data from the third memory means and feeding the read-out data to the digital-to-analog converting means according to the judgment results.

The phase modulator further comprises a filter means provided as a stage succeeding the digital-to-analog converting means and serving to delete spectrum more than an angular frequency of 30/T of the input binary digital signal.

The function according to the present invention will now be described. In response to changes in an input binary digital signal, as a phase-modulated waveform the following waveform is used.

The waveform, when it is changed in the increasing direction, has "0" level in a first period of T/12 (T corresponding to one-half cycle of the binary digital signal), is changed as a waveform of $(h/2)(1+\cos(3\pi t/T)+\pi/4)$ in the next period of 4T/12 ($-5T/12 \leq t \leq -T/12$) and has an h (constant) level in the remaining period of T/12, and when it is changed in the reducing direction, has the h level in the first period of T/12, is changed as a waveform of $(h/2)(1+\cos(3\pi t/T)-\pi/4)$ in the next period of 4T/12 ($T/12 \leq t \leq 5T/12$) and also has "0" level in the remaining period of T/12.

For the brevity sake, this waveform is referred to as 3rd order cosine pulse. By using the 3rd order cosine pulse, a first part is in the time width of $\pm T/12$ with respect to decision points. It is thus possible to improve the immunity to the effects of digital signal, obtain the decision points with a sole single pulse and reduce the circuit scale and power consumption.

By utilizing the characteristics of the 3rd order cosine pulse, it is possible to delay the change start time of one waveform of the IQ signal by T/12 and advance the other waveform by T/12 and, in consequence, it is possible to prevent the phased-modulating wave envelope from momentarily becoming zero and eliminate waveform distortion caused due to non-linear characteristics of a succeeding stage high frequency amplifier.

Other objects and features will be clarified from the following description with reference to attached drawings.

BRIEF DESCRIPTION OF THE DRAWINGS

FIG. 7 is a block diagram according to another embodiment of the present invention;

PREFERRED EMBODIMENTS OF THE INVENTION

Preferred embodiments of the present invention will now be described with reference to the drawings.

Figure 1:
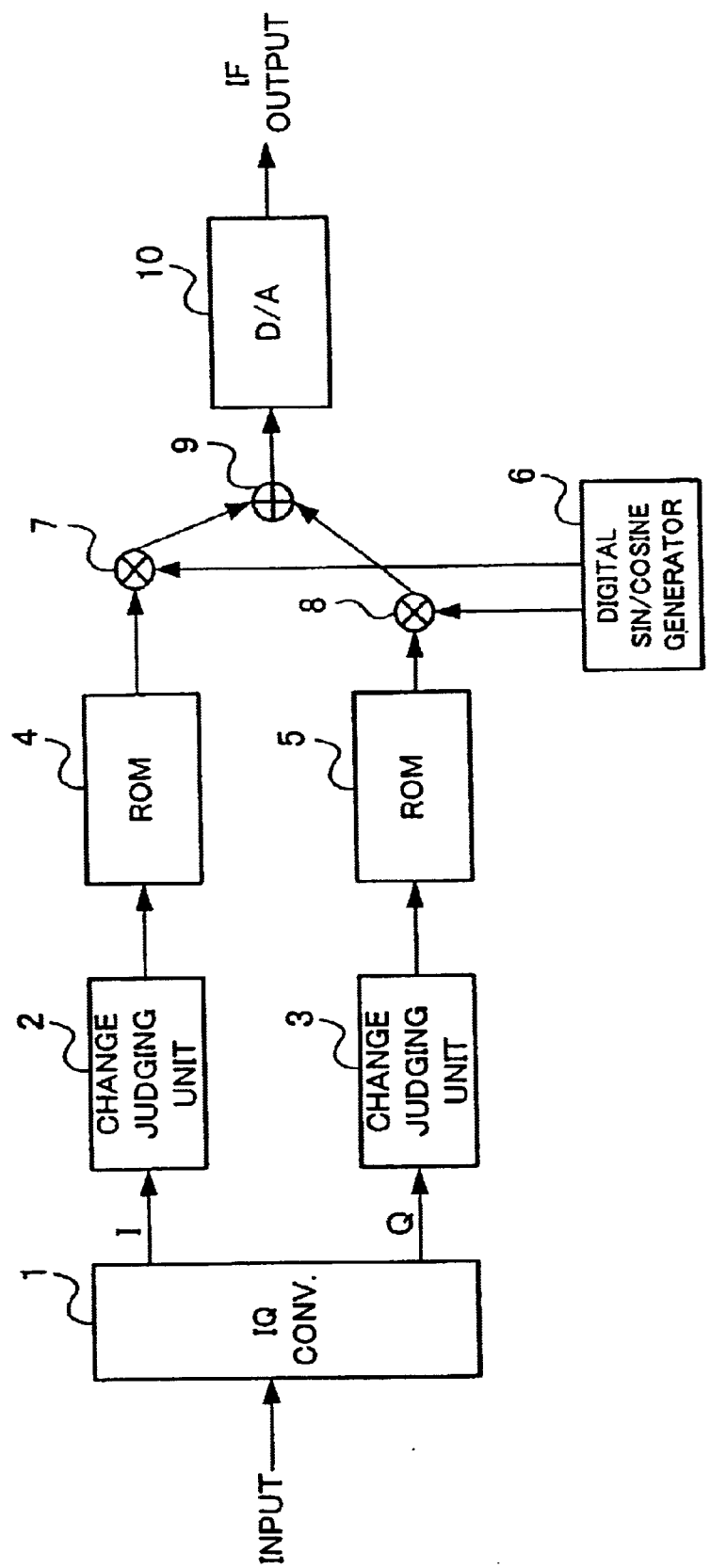
FIG. 1 is a block diagram according to an embodiment of the present invention.

FIG. 1 is a block diagram showing an embodiment of four-phase modulator according to the present invention. Referring to FIG. 1, an input signal of a bit train is inputted to an IQ converter 1 for conversion to I and Q signals. These I and Q signals are inputted to change judging units 2 and 3 for judging a single pulse change ("1" to "0", "1" to "0"). A detection output corresponding to the pulse change is fed as address input to ROMs 4 and 5, and memory outputs corresponding to the input address are derived and fed to multipliers 7 and 8.

In the meantime, a digital sine-cosine generator 6 is provided, and generates orthogonal (i.e., sine and cosine) carrier waves in 90 degrees out of phase with each other as digital signals. These signals are fed as other inputs to the multipliers 7 and 8. The multipliers 7 and 8 execute digital multiplification, and the product outputs are additively combined in an adder 9. The combined output is converted in a D/A converter 10 to an analog signal, which is outputted as an IF signal.

According to the present invention, for determining the waveform of a pulse, a change on a time axis is made to correspond to that pulse instead of carrying out a waveform process taking the effects of preceding and succeeding pulses into considerations. To this end, a pulse of a waveform as shown in FIG. 2 (hereinafter referred to as 3rd order cosine pulse), is used instead of the raised cosine pulse shown in the above non-patent literature 2.

Figure 2:
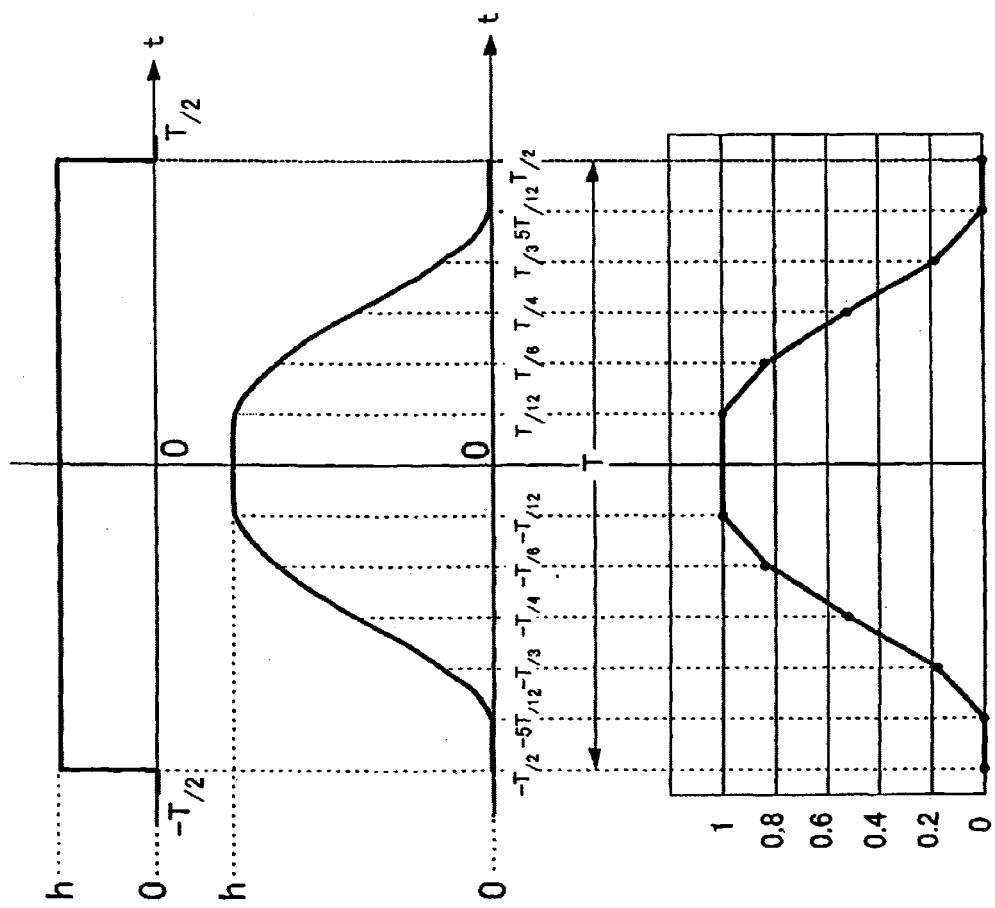
FIG. 2 is a view for describing a so-called 3rd raised cosine pulse used according to the present invention.
Figure 12:
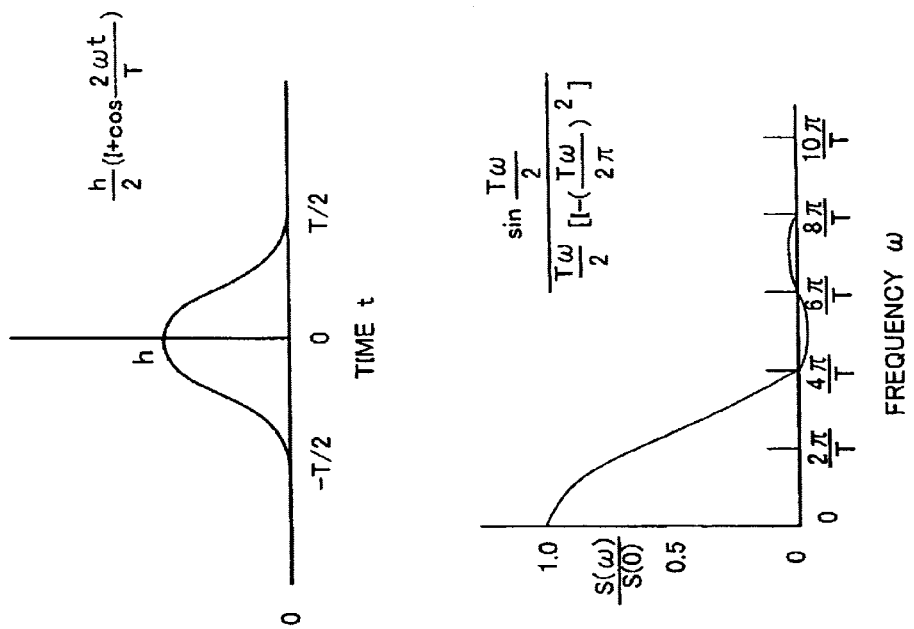
FIG. 12 is a drawing representing the spectrum of the raised cosine pulse.
Figure 11:
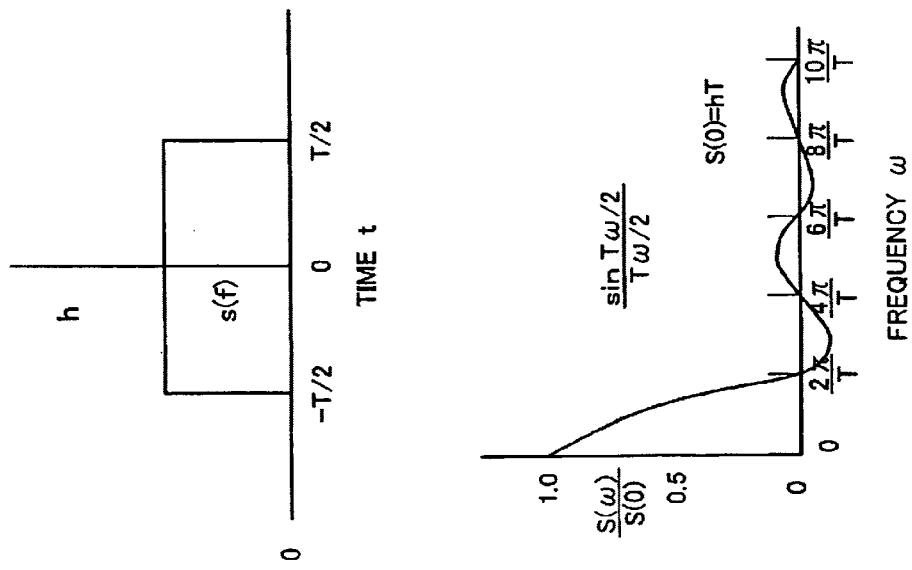
FIG. 11 is a drawing representing the spectrum of the rectangular pulse.

More specifically, denoting the half cycle of each bit of the digital signal by T, as shown in the middle part of FIG. 2, the waveform of the 3rd order cosine pulse in the present invention, assumes a fixed level value of h in a time width of $\pm T/12$ and also assumes a fixed value of zero in time width of $\pm T/12$ in the neighborhood of $\pm T/2$. This characteristic has a flat parts in time width of $\pm T/12$ around level decision points. Thus, compared to the above raised cosine pulse shown in FIG. 12, the 3rd order cosine pulse has an advantage that it is more immune to the effects of the timing pulse jitter.

The 3rd order cosine pulse has 3/2 times the slope of the raised cosine pulse, and its waveform is given by the following equation.

$$s(t)T \begin{cases} 0 \wedge \wedge \wedge \frac{5}{12}T \le t \\ \frac{h}{2}\{1+\cos(\frac{3\pi}{T}t - \frac{\pi}{4})\} \wedge \wedge \frac{1}{12}T \le t \le \frac{5}{12}T \\ h \wedge \wedge -\frac{1}{12}T \le t \le \frac{1}{12}T \\ \frac{h}{2}\{1+\cos(\frac{3\pi}{T}t + \frac{\pi}{4})\} \wedge \wedge \frac{1}{12}T \le t \le \frac{5}{12}T \\ 0 \wedge \wedge t \le -\frac{5}{12}T \end{cases} \quad (1)$$

The spectrum of this wave form is obtained as follows. First, term a of Fourier integral is obtained as:

$$a(\omega) = \int_{-\infty}^{+\infty} s(t)\cos(\omega t)dt \quad (2)$$

Then, this is obtained for three integral sections as:

$$a_1(\omega) = \int_{\frac{1}{12}T}^{\frac{5}{12}T} \frac{h}{2}\{1+\cos(\frac{3\pi}{T}t - \frac{\pi}{4})\}\cos(\omega t)dt \quad (3)$$

$$= \frac{h}{2}\int_{\frac{1}{12}T}^{\frac{5}{12}T}[\cos(\omega t) + \frac{1}{2}\cos\{(\omega + \frac{3\pi}{T})t - \frac{\pi}{4}\} +$$

$$\frac{1}{2}\cos\{(\omega - \frac{3\pi}{T})t + \frac{\pi}{4}\}]dt$$

$$= \frac{h}{2}\{(\frac{1}{\omega} - \frac{1}{2}\cdot\frac{T}{\omega T + 3\pi} - \frac{1}{2}\cdot\frac{T}{\omega T - 3\pi})\sin(\frac{5}{12}T\omega) -$$
$$(\frac{1}{\omega} + \frac{1}{2}\cdot\frac{T}{\omega T + 3\pi} + \frac{1}{2}\cdot\frac{T}{\omega T - 3\pi})\sin(\frac{1}{12}T\omega)\}$$

$$a_2(\omega) = \int_{-\frac{1}{12}T}^{+\frac{1}{12}T} h\cos(\omega t)dt$$

$$= \frac{2h}{\omega}\sin(\frac{1}{12}T\omega)$$

$$a_3(\omega) = \int_{-\frac{5}{12}T}^{-\frac{1}{12}T} \frac{h}{2}\{1+\cos(\frac{3\pi}{T}t + \frac{\pi}{4})\}\cos(\omega t)dt$$

$$= \frac{h}{2}\int_{\frac{1}{12}T}^{\frac{5}{12}T}[\cos(\omega t) + \frac{1}{2}\cos\{(\omega + \frac{3\pi}{T})t - \frac{\pi}{4}\} +$$

$$\frac{1}{2}\cos\{(\omega - \frac{3\pi}{T})t - \frac{\pi}{4}\}]dt$$

$$= \frac{h}{2}\{(\frac{1}{\omega} - \frac{1}{2}\cdot\frac{T}{\omega T + 3\pi} - \frac{1}{2}\cdot\frac{T}{\omega T - 3\pi})\sin(\frac{5}{12}T\omega) -$$
$$(\frac{1}{\omega} + \frac{1}{2}\cdot\frac{T}{\omega T + 3\pi} + \frac{1}{2}\cdot\frac{T}{\omega T - 3\pi})\sin(\frac{1}{12}T\omega)\}$$

The whole term a is:

$$a(\omega) = a_1(\omega) + a_2(\omega) + a_3(\omega) \quad (4)$$

$$= \frac{2h}{\omega}\sin(\frac{1}{12}T\omega) +$$

$$h(\frac{1}{\omega} - \frac{1}{2}\cdot\frac{T}{3\pi + T\omega} - \frac{1}{2}\cdot\frac{T}{\omega T - 3\pi})\sin(\frac{5}{12}T\omega) -$$

$$h(\frac{1}{\omega} + \frac{1}{2}\cdot\frac{T}{3\pi + T\omega} + \frac{1}{2}\cdot\frac{T}{\omega T - 3\pi})\sin(\frac{1}{12}T\omega)$$

Term b of the Fourier integral is obtained as $$b(\omega) = \int_{-\infty}^{+\infty} s(t)\sin(\omega t)dt \quad (5)$$

Thus, we have $$b_1(\omega) = \int_{\frac{1}{12}T}^{\frac{5}{12}T} \frac{h}{2}\left\{1 + \cos\left(\frac{3\pi}{T}t - \frac{\pi}{4}\right)\right\}\sin(\omega t)dt \quad (6)$$

$$= \frac{h}{2}\int_{\frac{1}{12}T}^{\frac{5}{12}T}\left[\sin(\omega t) + \frac{1}{2}\sin\left\{\left(\omega + \frac{3\pi}{T}\right)t - \frac{\pi}{4}\right\} + \frac{1}{2}\sin\left\{\left(\omega - \frac{3\pi}{T}\right)t + \frac{\pi}{4}\right\}\right]dt$$

$$= \frac{h}{2}\left\{\left(-\frac{1}{\omega} + \frac{1}{2}\cdot\frac{T}{\omega T + 3\pi} + \frac{1}{2}\cdot\frac{T}{\omega T - 3\pi}\right)\cos\left(\frac{5}{12}T\omega\right) + \left(\frac{1}{\omega} + \frac{1}{2}\cdot\frac{T}{\omega T + 3\pi} + \frac{1}{2}\cdot\frac{T}{\omega T - 3\pi}\right)\cos\left(\frac{1}{12}T\omega\right)\right\}$$

$$b_2(\omega) = \int_{-\frac{1}{12}T}^{+\frac{1}{12}T} h\sin(\omega t)dt$$

$$= h\left[-\frac{1}{\omega}\cos(\omega t)\right]_{-\frac{1}{12}T}^{+\frac{1}{12}T} = 0$$

$$b_3(\omega) = \int_{-\frac{5}{12}T}^{-\frac{1}{12}T} \frac{h}{2}\left\{1 + \cos\left(\frac{3\pi}{T}t + \frac{\pi}{4}\right)\right\}\sin(\omega t)dt$$

$$= \frac{h}{2}\int_{-\frac{5}{12}T}^{-\frac{1}{12}T}\left[\sin(\omega t) + \frac{1}{2}\sin\left\{\left(\omega + \frac{3\pi}{T}\right)t + \frac{\pi}{4}\right\} + \frac{1}{2}\sin\left\{\left(\omega - \frac{3\pi}{T}\right)t - \frac{\pi}{4}\right\}\right]dt$$

$$= \frac{h}{2}\left\{\left(\frac{1}{\omega} - \frac{1}{2}\cdot\frac{T}{\omega T + 3\pi} - \frac{1}{2}\cdot\frac{T}{\omega T - 3\pi}\right)\cos\left(\frac{5}{12}T\omega\right) - \left(\frac{1}{\omega} + \frac{1}{2}\cdot\frac{T}{\omega T + 3\pi} + \frac{1}{2}\cdot\frac{T}{\omega T - 3\pi}\right)\cos\left(\frac{1}{12}T\omega\right)\right\}$$

$$b(\omega) = b_1(\omega) + b_2(\omega) + b_3(\omega) = 0 \quad (7)$$

$$S(\omega)^2 = a(\omega)^2 + b(\omega)^2 \quad (8)$$

$$S(\omega)^2 = a(\omega)^2 \quad (9)$$

$$S(\omega) = \sqrt{a(\omega)^2} = |a(\omega)| \quad (10)$$

$$= hT\left|\left(\frac{1}{\omega T} - \frac{1}{2}\cdot\frac{1}{\omega T + 3\pi} - \frac{1}{2}\cdot\frac{1}{\omega T - 3\pi}\right)\cdot\left\{\sin\left(\frac{1}{12}\omega T\right) + \sin\left(\frac{5}{12}\omega T\right)\right\}\right|$$

$$S(0) = \lim_{\omega\to 0} S(\omega) = \frac{hT}{2} \quad (11)$$

$$\frac{S(\omega)}{S(0)} = 2\cdot\left|\left(\frac{1}{\omega T} - \frac{1}{2}\cdot\frac{1}{\omega T + 3\pi} - \frac{1}{2}\cdot\frac{1}{\omega T - 3\pi}\right)\cdot\left\{\sin\left(\frac{1}{12}\omega T\right) + \sin\left(\frac{5}{12}\omega T\right)\right\}\right| \quad (12)$$

The waveform as a plot of such 3rd order cosine pulse (under assumption of h=1) by sampling the level at intervals of T/12, is shown in the lower part of FIG. 2. As shown, the level is "0" at ±T/2, "0" at ±5T/12, "0.18" at ±T/3, "0.5" at ±T/4, "0.81" at ±T/6 and "1" at ±T/12 and 0.

The above level values corresponding to the respective time instants are preliminarily stored in the ROMs 4 and 5 in FIG. 1. Then, the level values corresponding to the time instants of −T/2 to 0 are read out in time sequence from the ROM with digital signal level change of "0" to "1", and the level values corresponding to the time instants of 0 to +T/2 are read out in time sequence from the ROM with level change of "1" to "0".

As for the orthogonal carriers as carrier waves, the digital sine-cosine generator 6 generates sine and cosine waveform digital signals (i.e., digital signals corresponding to individual levels of the sine and cosine waveforms) for the I and Q trains of the IQ signal, and the multipliers 7 and 8 performs digital multiplying processes on these digital signals. The outputs of the multipliers 7 and 8 are digitally added in the adder 9, and the sum output is converted in the D/A converter 10 to an analog signal, which is transmitted as IF output signal via the next stage IF amplifier or RF converter. The four-phase modulator implements the above sequence of operations.

The digital sine/cosine generator 6 may have a construction that the level values of the sine and cosine waveforms are preliminarily stored in a ROM and read out in time sequence therefrom.

Figure 3:
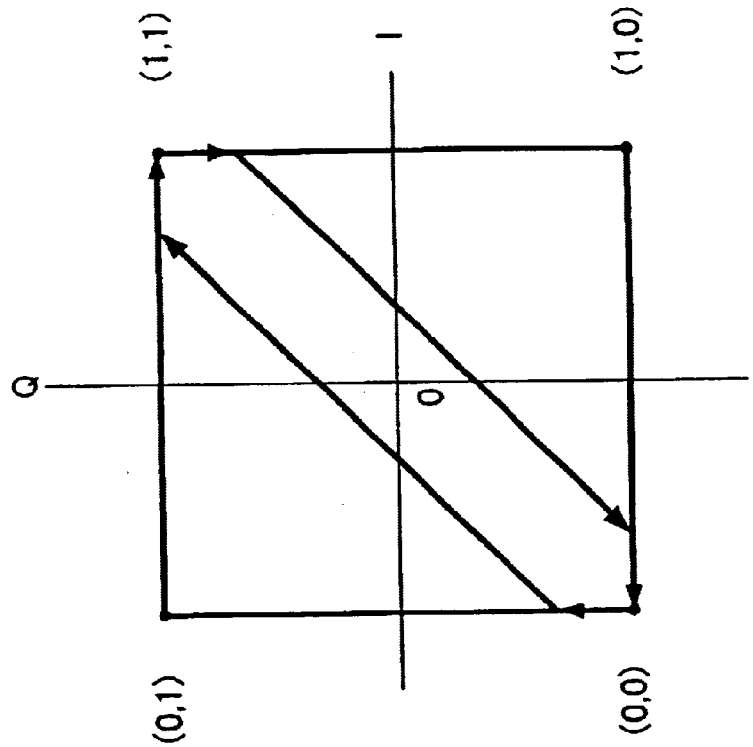
FIG. 3 is a view showing the vector transition state, in IQ base plane, of the phase-modulated output of a four-phase modulator.

The output vector of the four-phase modulator is mapped on the IQ phase plane as shown in FIG. 3. Arrows in the Figure represent the phase transfer states. While the vector is changed between the first and third quadrants and also between the second and fourth quadrants, it passes through the origin on the IQ phase plane. At this time, the envelope of the phase modulation signal momentarily becomes zero. Signal distortion is thus produced as described before. A second embodiment of the present invention is provided to solve this problem. Specifically, a waveform is provided, which is such that only in the case of the vector change between the first and third quadrants and also between the second and fourth quadrants, a change of (h/2)(1+cos(3πt/T)+π/4) or the like is provided for one waveform signal of the IQ signal immediately, i.e., without provision of the time of T/12, while for the other waveform signal a conversion of (h/2)(1+cos(3πt/T)+π/4) or the like is provided after time extension of T/12 to 2T/12 (=T/6).

Figure 4:
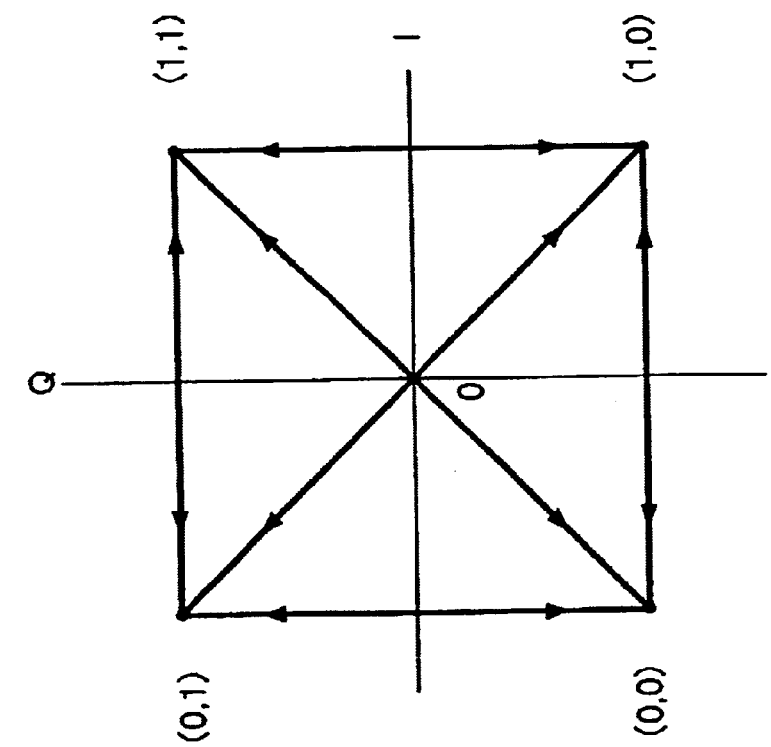
FIG. 4 is a view showing a modification example of a 3rd order cosine pulse used in a different embodiment of the present invention.

Specifically, the dashed line pulse waveforms as shown in FIG. 4 are used. Referring to FIG. 4, the solid plot represents the pulse waveform of the 3rd order cosine pulse shown in FIG. 2. The dashed line pulse waveforms are obtained by shifting this waveform by ±T/12, respectively, on the time axis. According to the invention, the waveform obtained by the shift by +T/12 (i.e., T/12 rightward on the time axis) is made to correspond to the I phase signal, and the waveform obtained by the shift by −T/12 (i.e., T/12 leftward on the time axis) is made to correspond to the Q phase signal.

Figure 6:
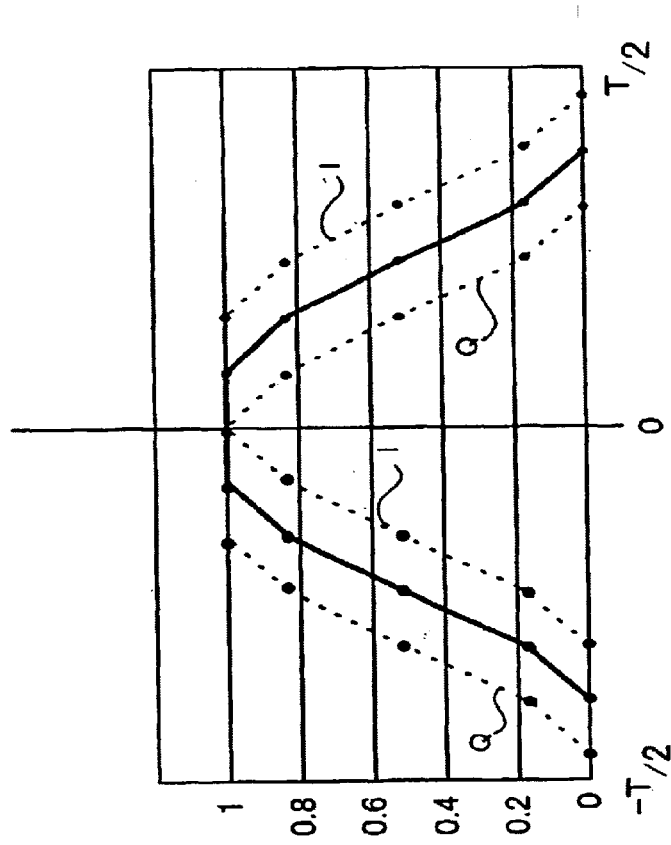
FIG. 6 is a view showing the vector transition state, in IQ phase plane, when the vector is changed between the second and fourth quadrants in the IQ phase plane in a different embodiment of four-phase modulator according to the present invention.
Figure 5:
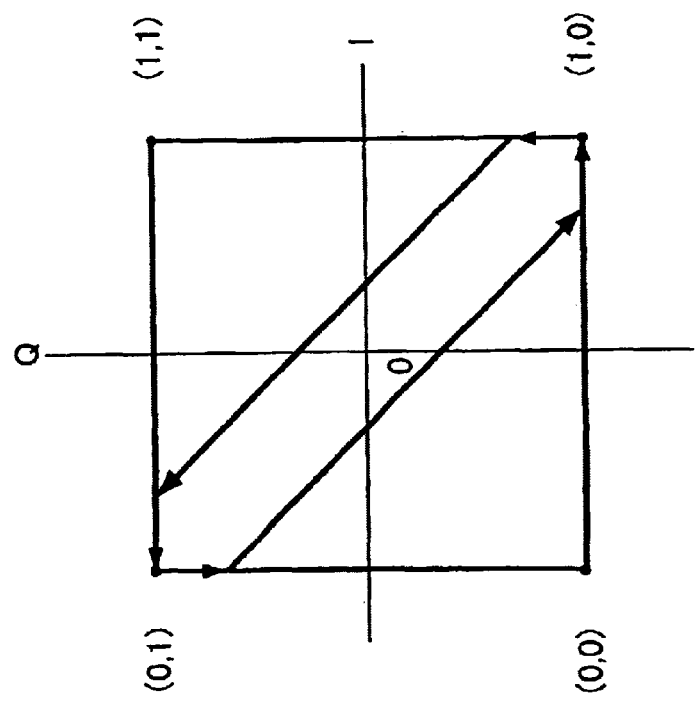
FIG. 5 is a view showing the vector transition state, in IQ phase plane, when the vector is changed between the first and third quadrants in the IQ phase plane in a different embodiment of four-phase modulator according to the present invention.

Thus, when the phase-modulated wave vector is changed between the first and third quadrants, a phase transition state as shown by arrows in FIG. 5 (i.e., a clockwise change) is obtained. When the vector is changed between the second and fourth quadrants, a phase transition state (i.e., a counterclockwise change) as shown by arrows in FIG. 6 is obtained. As a result, the vector does not pass through the origin on the IQ base plane, the signal envelope does not become zero, and the problem of the signal distribution can be solved.

In this case, there may arise a case when the vector fails to pass through the mid value h/2 of the oscillation amplitude at a mid time point (t=±T/4) between the level decision points, but such a phenomenon also occurs in the usual system. However, the phenomenon does not occur to such a great extent as to give rise to any problem. As shown, according to the present invention when and only when changes occur on both the I and Q axes at the same time, the change in one signal is advanced, and the change in the other is retarded. Thus, no trace passing through the origin of the IQ phase plane is present, but all traces do not pass through the origin but pass the neighborhood thereof.

FIG. 7 is a block diagram showing the circuit of the second embodiment. In the Figure, parts like those in FIG. 1 are designated by like reference numerals. As shown in the Figure, a quadrant change judging unit 11 is added to the structure as shown in FIG. 1 such that it detects, according to the I and Q signals, that the quadrant change state is changed between the first and third quadrants and also between the second and fourth quadrants. The result of detection is used as address inputs to ROMs 4 and 5.

In this case, level values corresponding to individual instants of the dashed line waveforms shown in FIG. 4 are stored in addition to the level values corresponding to individual instants of the solid line waveform in the ROMs 4 and 5, and when a change between the first and third quadrants or between the second and fourth quadrants is detected, values read out from the ROMs 4 and 5 are made to correspond to read-out values from the ROMs 4 and 5 are made to correspond to the dashed line waveforms shown in FIG. 4.

With the selection of the level values of the 3rd raised cosine pulse to be stored in the ROMs 4 and 5 such that the change takes place in the clockwise rotation between the first and third quadrants as shown in FIG. 5 and in the counterclockwise direction between the second and fourth quadrants as shown in FIG. 6, unlike the case when both the changes are in the same direction rotations, off-set (i.e., frequency division) of the carrier frequency can be prevented. This is done so for the purpose of preventing rotation in one direction in the phase space, which corresponds to a frequency increase or reduction in one direction.

While in this embodiment the change is adopted to take place in the clockwise direction in the first and third quadrants and in the counterclockwise direction between the second and fourth quadrants.

Figure 8:
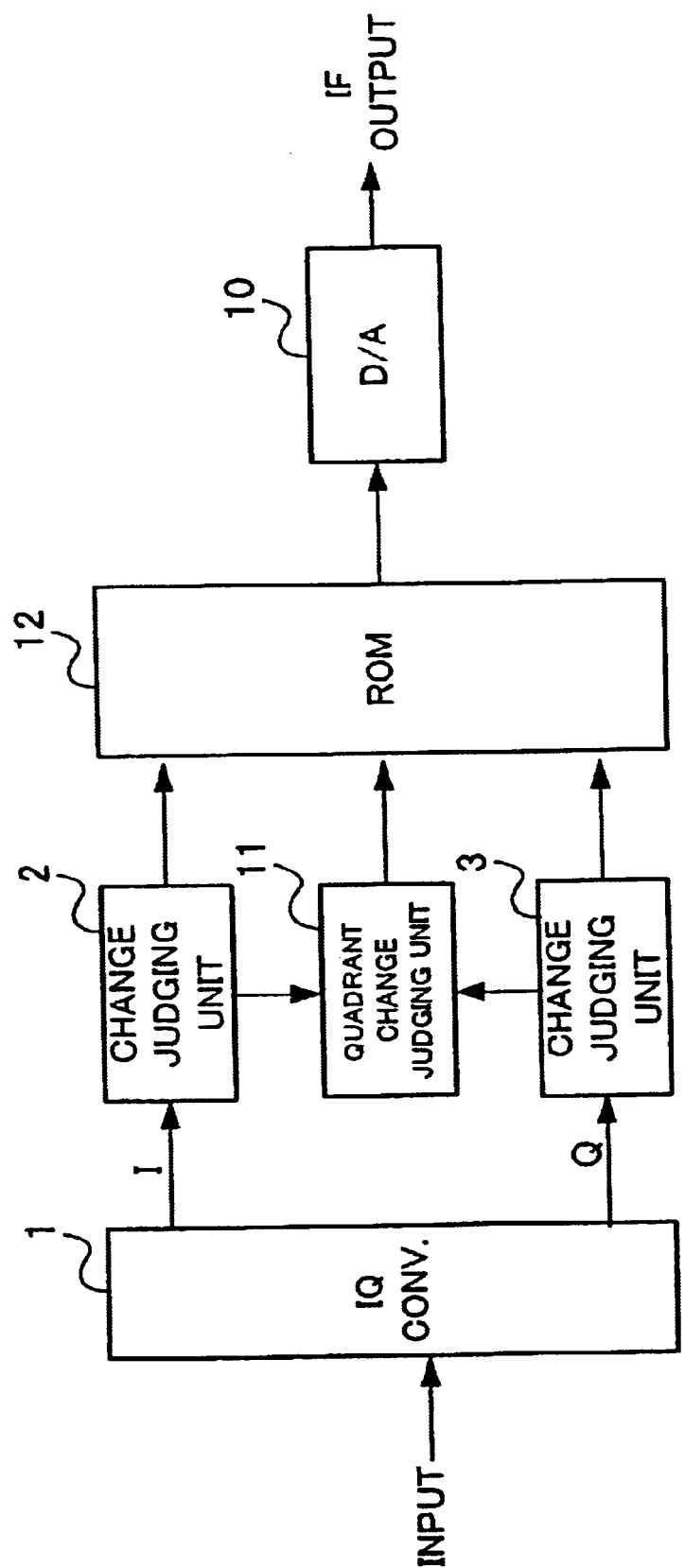
FIG. 8 is a block diagram according to other embodiment of the present invention.

FIG. 8 is a block diagram showing a third embodiment of the present invention. In the Figure, parts like those in FIG. 7 are designated by like reference numerals. In the case of FIG. 7, the level values in the individual instants of the 3rd cosine pulse are stored in the ROMs 4 and 5. In this embodiment, the sum result of addition of the product results from the multipliers 7 and 8 in FIG. 7 in the adder 9 are preliminarily stored in the ROM 12, thus permitting reduction of the circuit scale and power consumption. A similar construction to this case is applicable to this case.

Figure 9:
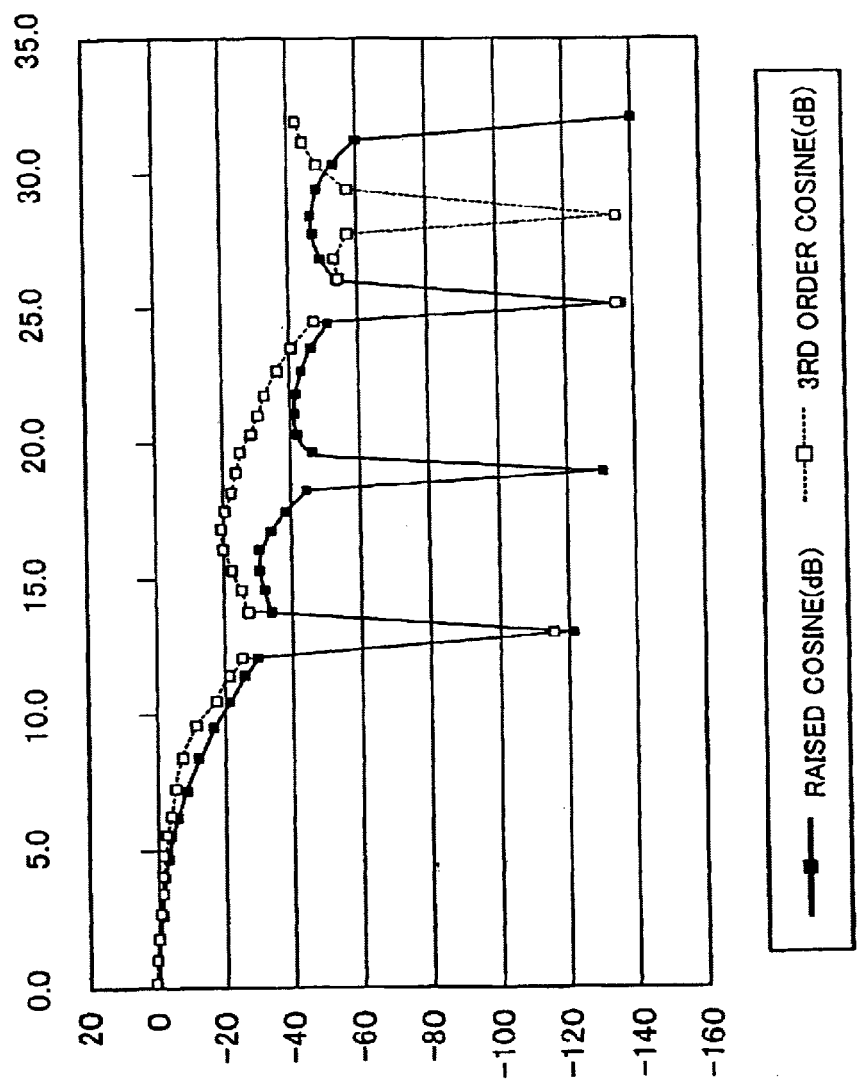
FIG. 9 is a spectrum comparison of the raised cosine pulse and the 3rd order cosine pulse.
Figure 10:
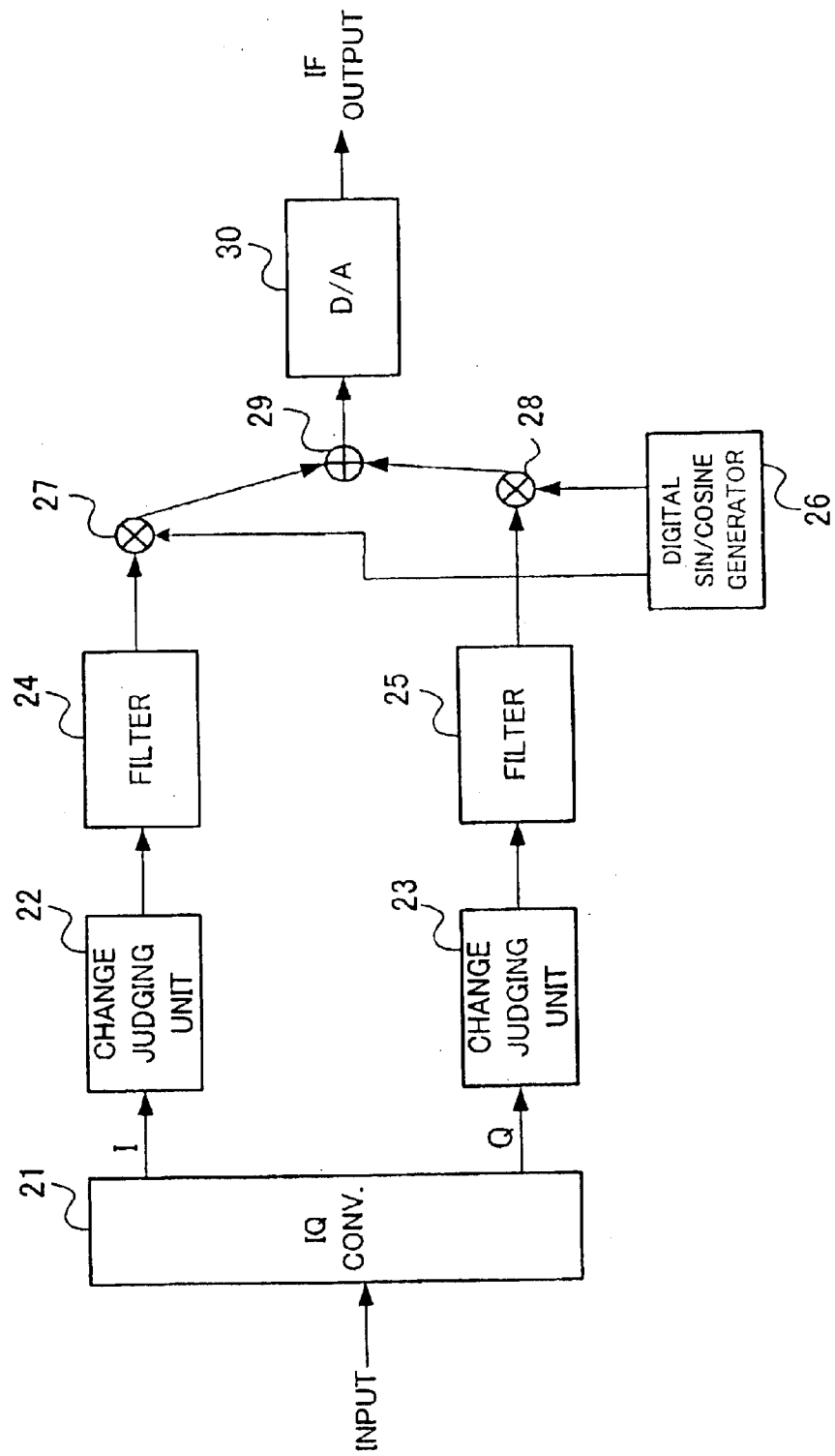
FIG. 10 is a bock diagram of the prior art.

As has been described before, a new waveform called 3rd raised cosine pulse is defined and used as a waveform for producing a phase-modulated signal corresponding to a change in a single bit of an input digital signal. In this case, it is anticipated that the spectrum becomes broad compared to the usually employed raised cosine pulse shown in FIG. 12. However, compared to the raised cosine pulse, the 2nd side lobe is 21 dB, which is a mere deterioration of 10 dB compared to 31 dB in the case of the raised cosine pulse. Also, as shown in the spectrum comparison diagram shown in FIG. 9, a broad null part is present, and it is thus possible to use a band-pass filter for deleting a spectrum part more than the 3r side lobe as a filter, which is to be prepared in the succeeding stage. Sharp waveform shaping is thus possible.

It is a first effect obtainable according to the present invention that immunity of the input bit train to the effects of timing pulse jitter is improved. This is so because owing to the use of the 3rd raised cosine pulse as the phase-modulated waveform a flat part is produced in the time widths of ±T/12 before and after decision points.

It is a second effect obtainable according to the present invention is that it is possible to reduce the circuit scale and power consumption. This is so because of the fact that a phase-modulated waveform corresponding to a change in a single bit of the input digital signal is produced.

It is a third effect obtainable according to the present invention that when the transferred signal passes through the high frequency amplifier, it is not distorted by the non-linear characteristics (saturation characteristics) of the amplifier. This is so because of the fact that the change start instant in either one of the I and Q signals is retarded while advancing the change start instant of the other, and it is thus possible to prevent the envelope of the phase-modulated signal from becoming zero.

It is a fourth effect obtainable according to the present invention that it is possible to prevent an off-set of the carrier frequency due to a change in the phase-modulated signal. This is so because the change between the first and second quadrants and the change between the second and fourth quadrants are based on opposite directions, respectively.

It is a fifth effect obtainable according to the present invention that the circuit scale and the power consumption are further reduced. This is so because it is possible to construct the digital sine/cosine generator and the 3rd raised cosine pulse generator part as ROM and also construct a major part of the circuit inclusive of the multipliers and adder as ROM.

It is a sixth effect obtainable according to the present invention that it is readily possible to shape the spectrum. This is so because the spectrum of the 3rd raised cosine pulse contains two missing parts before and after an angular frequency×T=28. That is, it is possible to provide a filter for deleting a spectrum part more than an angular frequency× T=30 as a stage subsequent to the D/A converter, and thus the spectrum shaping is obtainable without having great adverse effects on the nearer spectrum part.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A phase modulator for generating digital signals of phase-modulated carriers in response to changes in an input binary digital signal by using a waveform which, when it is changed in the increasing direction, has "0" level in a first period of T/12 (T corresponding to one-half cycle of the binary digital signal), is changed as a waveform of $(h/2)(1+\cos(3\pi t/T)+\pi/4)$ in the next period of $4T/12$ $(-5T/12 \leq t \leq -T/12)$ and has an h (constant) level in the remaining period of T/12, and when it is changed in the reducing direction, has the h level in the first period of T/12, is changed as a waveform of $(h/2)(1+\cos(3\pi t/T)-\pi/4)$ in the next period of $4T/12$ $(T/12 \leq t \leq 5T/12)$ and also has "0" level in the remaining period of T/12.

2. The phase modulator according to claim 1, which comprises an orthogonal carrier generating means for generating orthogonal carriers as the afore-said carriers, a means for converting the input binary digital signal to two trains of IQ signals corresponding to the orthogonal carriers, a phase modulating means for generating digital phase-modulated waves by phase modulating the orthogonal carriers with the individual waveforms of the two-train IQ signal, and a digital-to-analog converter means for converting a synthesized output of the digital phase-modulated waves and outputting the result of conversion as analog output.

3. The phase modulator according to claim 2, which further comprises a first memory means, in which increasing and reducing direction waveform data of the individual waveforms of the IQ signal are preliminarily stored, a second memory means, in which waveform data of the orthogonal carrier are preliminarily stored, and a change judging means for judging changes in the IQ signals and reading out data stored in the first memory means according to the result of the judgment, the phase modulating means including a multiplying means for multiplying data read out from the first memory means and data read out from second memory means, the product result being outputted to the digital-to-analog converting means.

4. The phase modulator according to claim 2, wherein in response to changes between the first and third quadrants and also between the second and fourth quadrants in the IQ phase plane of the IQ signals, a waveform change of $(h/2)(1+\cos(3\pi t/T)+\pi/4)$ is provided to one waveform signal of the IQ signals immediately, i.e., without provision of the first period of T/12, and a waveform change of $(h/2)(1+\cos(3\pi t/T)+\pi/4)$ is provided to the other waveform signal of the IQ signals after extension of the first period of T/12 to 2T/12.

5. The phase modulator according to claim 4, wherein the change between the first and third quadrants and the change between the second and fourth quadrants are based on opposite direction rotations, respectively.

6. The phase modulator according to claim 4, which further comprises a first memory means, in which increasing and reducing direction waveform data of the individual waveforms of the IQ signal are preliminarily stored, a second memory means, in which waveform data of the orthogonal carriers are preliminarily stored, and a change judging means for judging changes in the IQ signals and reading out data stored in the first memory means according to the result of the judgment, the phase modulating means including a multiplying means for multiplying data read out from the first memory means and data read out from second memory means, the product result being outputted to the digital-to-analog converting means.

7. The phase modulator according to claim 4, wherein:

the phase modulating means includes a first memory means, in which the sum results of the products of the increasing and reducing direction waveform data of the individual waveforms of the IQ signal and the waveform data of the orthogonal carrier are preliminarily stored; and the phase modulator further comprises a means for judging changes in the IQ signal, reading out stored data from the first memory means and feeding the read-out data to the digital-to-analog converting means according to the judgment results.

8. The phase modulator according to claim 4, wherein:

the phase modulating means includes a first memory means, in which the sum results of the products of the increasing and reducing direction waveform data of the individual waveforms of the IQ signal and the waveform data of the orthogonal carrier are preliminarily stored; and the phase modulator further comprises a means for judging changes in the IQ signal and inter-quadrant change in the IQ phase plane, reading out stored data from the first memory means and feeding the read-out data to the digital-to-analog converting means according to the judgment results.

9. A phase modulator according to claim 2, which further comprises a filter means provided as a stage succeeding the digital-to-analog converting means and serving to delete spectrum more than an angular frequency of 30/T of the input binary digital signal.

10. The phase modulator according to claim 5, which further comprises a first memory means, in which increasing and reducing direction waveform data of the individual waveforms of the IQ signal are preliminarily stored, a second memory means, in which waveform data of the orthogonal carrier are preliminarily stored, and a change judging means for judging changes in the IQ signals and reading out data stored in the first memory means according to the result of the judgment, the phase modulating means including a multiplying means for multiplying data read out from the first memory means and data read out from second memory means, the product result being outputted to the digital-to-analog converting means.

11. The phase modulator according to claim 5, wherein:

the phase modulating means includes a first memory means, in which the sum results of the products of the increasing and reducing direction waveform data of the individual waveforms of the IQ signal and the waveform data of the orthogonal carrier are preliminarily stored; and the phase modulator further comprises a means for judging changes in the IQ signal, reading out stored data from the first memory means and feeding the read-out data to the digital-to-analog converting means according to the judgment results.

12. The phase modulator according to claim 5, wherein:

the phase modulating means includes a first memory means, in which the sum results of the products of the increasing and reducing direction waveform data of the individual waveforms of the IQ signal and the waveform data of the orthogonal carrier are preliminarily stored; and the phase modulator further comprises a means for judging changes in the IQ signal and inter-quadrant change in the IQ phase plane, reading out stored data from the first memory means and feeding the read-out data to the digital-to-analog converting means according to the judgment results.

13. A phase modulator according to claim 3, which further comprises a filter means provided as a stage succeeding the digital-to-analog converting means and serving to delete spectrum more than an angular frequency of 30/T of the input binary digital signal.

14. A phase modulator according to claim 4, which further comprises a filter means provided as a stage succeeding the digital-to-analog converting means and serving to delete spectrum more than an angular frequency of 30/T of the input binary digital signal.

15. A phase modulator according to claim 5, which further comprises a filter means provided as a stage succeeding the digital-to-analog converting means and serving to delete spectrum more than an angular frequency of 30/T of the input binary digital signal.

16. A phase modulator according to claim 6, which further comprises a filter means provided as a stage succeeding the digital-to-analog converting means and serving to delete spectrum more than an angular frequency of 30/T of the input binary digital signal.

17. A phase modulator according to claim 7, which further comprises a filter means provided as a stage succeeding the digital-to-analog converting means and serving to delete spectrum more than an angular frequency of 30/T of the input binary digital signal.

18. A phase modulator according to claim 8, which further comprises a filter means provided as a stage succeeding the digital-to-analog converting means and serving to delete spectrum more than an angular frequency of 30/T of the input binary digital signal.

19. A phase modulator according to claim 10, which further comprises a filter means provided as a stage succeeding the digital-to-analog converting means and serving to delete spectrum more than an angular frequency of 30/T of the input binary digital signal.

20. A phase modulator according to claim 11, which further comprises a filter means provided as a stage succeeding the digital-to-analog converting means and serving to delete spectrum more than an angular frequency of 30/T of the input binary digital signal.

21. A phase modulator according to claim 12, which further comprises a filter means provided as a stage succeeding the digital-to-analog converting means and serving to delete spectrum more than an angular frequency of 30/T of the input binary digital signal.

* * * * *